United States Patent Office 2,823,113
Patented Feb. 11, 1958

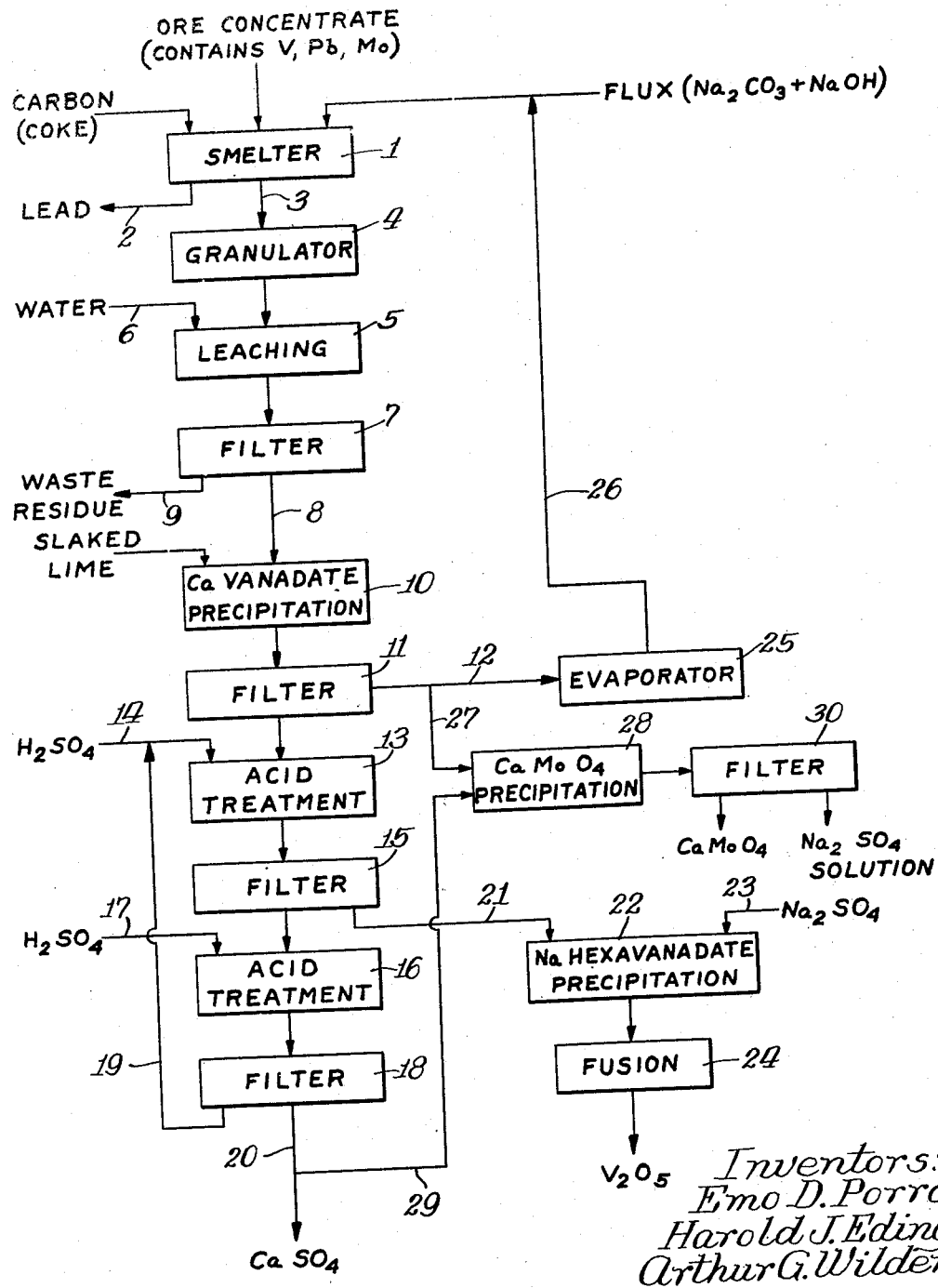

2,823,113

PROCESS OF TREATING VANADIUM AND MOLYBDENUM ORES

Emo D. Porro, Menlo Park, Harold J. Eding, Palo Alto, and Arthur G. Wilder, Menlo Park, Calif., assignors to Manila Mine Development Corporation, Chicago, Ill., a corporation of Illinois Application February 3, 1954, Serial No. 407,904

6 Claims. (Cl. 75—121)

This invention relates to the recovery of vanadium from low grade ores, particularly lead-vanadium ores and ores containing a minor amount of molybdenum.

In certain sections of the United States, and more often in the semi-arid regions of the Southwest, mineral deposits occur containing both lead and vanadium, but under existing recovery methods such ores have been considered too lean for economical processing and recovery of vanadium. Since high grade or rich vanadium ore deposits are rapidly being exhausted and since important new ones are not being discovered, it follows that there is an important potential demand for a process capable of satisfactorily handling low grade ores.

Such low grade ores are usually predominant in lead but contain subordinate amounts of vanadium along with minor quantities of other ingredients such as zinc, copper, iron, silica, alumina, and lime. In addition, certain ores of this general character such as vanadinite also contain a significant quantity of molybdenum usually in the form of wulfenite. In the recovery of vanadium from low grade ores it is frequently desirable as an economic proposition to operate the recovery plant as a custom smelter. In other words, ore would be purchased from numerous producers in various localities and then concentrated and treated for the recovery of lead and vanadium. However, the frequent or intermittent use of molybdenum-containing ores in such a plant introduces certain difficulties in the recovery process because of the tendency for vanadium and molybdenum to precipitate together. This is highly undesirable for commercial ferrovanadium production. Thus, it will be seen that a practical recovery process for handling low grade molybdenum-containing vanadium ores must include satisfactory means for overcoming the chemical and metallurgical problems introduced by the presence of molybdenum.

Accordingly, a primary object of our invention is to provide a novel vanadium recovery process capable of satisfactorily handling low grade vanadium ores containing minor amounts of molybdenum.

A further object of the invention is to provide a novel combination process for treating low grade lead vanadium ores containing minor amounts of molybdenum which process permits the separate recovery of both vanadium and molybdenum.

Another object of the invention is to provide a novel combination process for the recovery of vanadium from low grade ores, also containing minor amounts of molybdenum, which process utilizes a by-product from the vanadium recovery step in a separate recovery of molybdenum.

An additional object of the invention is to provide, in a process for the recovery of vanadium from low grade vanadium ores, novel means for recovering and preventing the build-up of molybdenum in the system.

Other objects and advantages of the invention will become apparent from the subsequent detailed description taken in conjunction with the accompanying drawing which is a diagrammatic flow sheet of the process of the invention.

The recovery process of our invention is predicated on the previously known use of lime as a reagent for the recovery of vanadium from alkaline solutions. The ore is first concentrated according to conventional procedures and the ore concentrate is then fused or smelted with a caustic flux. After separation of lead, the resultant slag is leached with water to obtain an alkaline leach solution containing water soluble compounds of vanadium and molybdenum. This alkaline leach solution is reacted with lime to precipitate calcium vanadate which is then extracted with sulfuric acid to obtain an acidic vanadium-rich liquor from which vanadium can readily be recovered. As will hereinafter appear, the use of lime as a reagent for the precipitation of calcium vanadate from the alkaline leach solution permits an excellent separation between vanadium and molybdenum since the molybdenum remains substantially entirely in the residual leach solution.

The significant novel feature of our invention resides in the handling of the residual leach solution. This solution can be concentrated readily by evaporation so that the relatively expensive smelting flux is made available for recycling to the smelting step. At the same time, the soluble molybdenum in the residual alkaline leach solution is likewise recycled in the concentrate. When molybdenum has accumulated in the system to an economically justifiable level, the recycling of the flux concentrate is temporarily discontinued and the molybdenum-containing solution is reacted with the calcium sulfate residue from the sulfuric acid extraction of the calcium vanadate precipitate thereby allowing recovery of molybdenum as calcium molybdate. Consequently, our novel combination process permits an economically significant recovery of molybdenum as an incident to the main vanadium recovery scheme and at the same time avoids the detrimental consequences of excessive accumulation of molybdenum within the system as a result of the recycling of the caustic concentrate.

Referring now to the drawing, the ore concentrate containing vanadium, lead, and molybdenum is fused in a smelter 1 with the introduction of a caustic flux, borax, and carbon in the form of coal or coke. The use of carbon is desirable to facilitate reduction of lead oxide in the ore concentrate. The caustic flux preferably comprises a mixture of sodium hydroxide and sodium carbonate although either ingredient may be used alone under certain circumstances.

Molten lead is recovered at 2 as a lead button and the slag is withdrawn at 3 and introduced into a suitable granulator or pulverizer 4. The comminuted slag is then subjected to a leaching operation at 5 with the introduction of water at 6. The mixture is filtered, as at 7, and an alkaline leach solution containing vanadium and molybdenum is separated at 8. The slag residue is discarded as at 9. For optimum leaching efficiency, we have found that the use of a mixture of approximately equal parts of sodium carbonate and sodium hydroxide as the flux in the smelting step gives best results. For example, the use of a flux containing 50 parts by weight each of sodium hydroxide and sodium carbonate per 100 parts of ore concentrate gives a leaching efficiency on the order of 95%.

The pregnant leach solution, containing sodium vanadate, sodium molybdate, sodium carbonate, sodium tetraborate, and sodium silicate, is then reacted with slaked lime in a calcium vanadate precipitation step 10. Preferably, a calculated quantity of lime is slurried with water and added to the pregnant leach solution at substantially the boiling temperature of the latter. After digestion for a suitable period of time to allow completion of the precipitation reactions, the reaction mixture is then filtered, as at 11, and a sodium hydroxide-containing filtrate is thereby separated from a cake containing the calcium vanadate precipitate in addition to calcium carbonate, calcium tetraborate and calcium silicate. The reaction of sodium vanadate with the lime is highly selective with respect to molybdenum so that there is substantially no precipitation of molybdenum at this point, the molybdenum remaining substantially entirely in solution in the residual leach solution or filtrate which is removed at 12. Although not shown in the drawing, we generally prefer to subject the calcium vanadate-containing precipitate from the filtration step 11 to water washing for the purpose of insuring complete removal of any molybdenum which may be occluded or carried over with the precipitate. The wash water may then be combined with the filtrate removed through line 12.

The calcium vanadate filter cake is then extracted in a first acid treatment step 13 with a predetermined amount of aqueous sulfuric acid introduced at 14. The extraction step may be carried out at a temperature somewhat above room temperature until the reaction is substantially complete. The mixture is then filtered as at 15, and the remaining filter cake is extracted in a second acid treatment step 16 with additional dilute aqueous sulfuric acid introduced at 17. The extraction mixture is again filtered at 18 and the acidic vanadium-rich extract is preferably recycled through a line 19 to the first acid treatment step 13. Residual filter cake comprising primarily calcium sulfate is removed at 20.

The vanadium-rich acidic extract removed as a filtrate from the filtration step 15 is then passed through a line 21 and is subjected to any suitable further treatment for the recovery of vanadium. For example, the acid vanadium solution may be boiled to throw out vanadium pentoxide as the final product. However, we prefer to employ a sodium hexavanadate precipitation technique wherein the acid vanadium solution is digested at an elevated temperature in a precipitation step 22 with the addition of sodium ion, such as by the addition of sodium sulfate at 23. The vanadium is thereby precipitated as sodium hexavanadate, although it is frequently desirable to initiate the precipitation reaction by the addition of a small quantity of solid sodium hexavanadate crystals. In this manner, a very high recovery of vanadium on the order of 95 to 98% may be realized, the sodium hexavanadate precipitate being commercially known as "red cake." The red cake is fluxed in a fusion step 24 at a temperature of from about 870° to about 925° C. to obtain a final commercial product known as "black" and containing on the order of 90 to 91% vanadium pentoxide.

An important feature of our invention which contributes materially to the economical feasibility of the process is the method of handling the residual leach solution containing sodium hydroxide which is removed at 12 following the calcium vanadate precipitation. This solution is preferably concentrated in an evaporator 25 to at least about 50% concentration of caustic or sodium hydroxide. This concentrate is then recycled, as at 26, to the smelting step 1, the proportion of recycled caustic and fresh flux ingredients being regulated to obtain the desired proportion of flux constituents in the smelting step. However, as hereinbefore mentioned, the residual alkaline leach solution removed at 12 also contains substantially all of the molybdenum which has been introduced into the system with the ore concentrate. Consequently, it will be seen that by recycling the caustic concentrate at 26 the molybdenum is also continuously returned to the system. After this recycle of molybdenum has continued, a point will be reached where the molybdenum concentration in the system is sufficient to justify its recovery. Furthermore, as the molybdenum concentration builds up in the system it becomes increasingly difficult to effect selective precipitation of vanadium at 10 without encountering objectionable carry over of molybdenum in the calcium vanadate filter cake. Accordingly, after continued recycling of caustic concentrate and molybdenum, it is eventually necessary to effect removal of molybdenum from the system. The exact point at which such molybdenum removal becomes necessary will, of course, depend upon numerous factors but generally speaking it will be desirable to allow the molybdenum concentration to build up as high as possible without undue interference with the calcium vanadate precipitation because recovery of molybdenum from the residual leach solution also results in loss of sodium hydroxide in this solution which is then no longer available for flux recycle.

When the predetermined molybdenum concentration has been reached in the recycle caustic stream the evaporation and recycle of caustic is temporarily discontinued and the molybdenum-containing solution is removed at 27 and treated for the recovery of its molybdenum content. This molybdenum recovery step is preferably accomplished, according to our invention, by reacting the residual leach solution in a precipitation step 28 with the calcium sulfate residue introduced as at 29. Because of the low solubility of calcium sulfate, the residue at 20 is preferably slurried in water and raised substantially to its boiling temperature before reaction with the molybdenum-containing leach solution at 28. Thus, our invention makes use of the calcium sulfate byproduct as a reagent for the recovery of molybdenum from the residual leach solution. After the molybdenum precipitation step is completed, the reaction mixture may be filtered at 30 to separate calcium molybdate precipitate from a sodium sulfate-containing filtrate.

According to the foregoing description, the concentration and recycling of the sodium hydroxide-containing leach solution from the calcium vanadate precipitation step is conducted more or less continuously until the molybdenum concentration in the system reaches a point at which separation and recovery of molybdenum is both desirable and economically feasible. At this point, the caustic recycling is temporarily discontinued and the molybdenum recovery operation utilizing the calcium sulfate by-product is carried out until the molybdenum concentration in the system is reduced to the desired extent. Thereafter, the molybdenum recovery is discontinued and the evaporation and recycling of caustic concentrate is resumed as above. However, it is also within the scope of our invention to conduct the molybdenum recovery operation in a more or less continuous fashion if desired rather than in the intermittent manner just described. In other words, a major portion of the residual leach solution at 12 may be continuously concentrated and recycled to the smelting step, and a relatively minor portion or drag stream of molybdenum-containing leach solution may be more or less continuously removed at 27 and subjected to the hereinbefore described treatment for the recovery of calcium molybdate. The choice of mode of operation will depend largely upon the molybdenum content of the ore concentrate, the loss of caustic which can be tolerated, apparatus limitations, and operating costs. Usually, the calcium sulfate residue removed at 20 will be in excess of the amount required for the calcium molybdate precipitation step and this calcium sulfate can be sold as a by-product of the process or it may be subjected to auto-oxidation at high temperatures for the production of sulfuric acid and calcium oxide, the latter then being available for use in the calcium vanadate precipitation step 10. The sodium sulfate filtrate separated at 30 following the calcium molybdate precipitation may also be evaporated for the recovery of sodium sulfate as an additional by-product of the process.

The following specific examples will illustrate the high vanadium recoveries which are possible in a typical operation of our process.

Example I

A typical ore concentrate used in the process contains 14.6% $V_2O_5$, 40.0% Pb, 2.9% Cu, 8.3% Zn, 5.1% $SiO_2$, 0.4% $Al_2O_3$, 7.2% $Fe_2O_3$ and 4.2% CaO. A quantity of about 1000 grams of this concentrate was mixed with 100 grams of borax, 50 grams of charcoal, and a flux comprising sodium hydroxide and sodium carbonate in the proportion of about 25 parts by weight of each per 100 parts of ore concentrate. The mixture was fused in a furnace at about 2000° F. and after fusion was complete and the resultant slag quiescent, 2 to 5 grams of $K_2NO_3$ were added. Following this addition, the molten mix was poured into molds in the form of inverted cones. After cooling, the lead button at the apex of the cone was separated from the slag.

A portion of the slag was pulverized and was leached with distilled water at 100° C. for several hours. The leach solution was analyzed and the total alkalinity determined as sodium carbonate. Then, 1⅓ equivalents of lime based on the total alkalinity were added. The lime was first ignited, cooled, and slurried with water, and then added to the boiling leach solution. The mixture was digested for approximately one hour and then filtered. The resultant cake containing calcium vanadate was washed.

The calcium vanadate cake containing 99.6% of the vanadium was mixed with a calculated quantity of dilute sulfuric acid sufficient to provide an extract solution at a pH of 4.0. The mixture was maintained slightly above room temperature until the reaction was complete. The mixture was filtered and the remaining cake comprising substantially calcium sulfate was washed. Approximately 5% of the original vanadium remained in the calcium sulfate cake. This was extracted in a second dilute sulfuric acid treatment and a total of about 95% of the available vanadium was extracted into the combined filtrate.

The acid vanadium-containing filtrate was digested at 80° C. and sodium sulfate was added to precipitate sodium hexavanadate. From 95 to 98% of the vanadium in solution was precipitated. The sodium hexavanadate precipitate was separated and fused at 870 to 925° C. to obtain a product analyzing 90 to 91% vanadium pentoxide.

Example II

The effectiveness of the separation of vanadium and molybdenum by the use of lime to precipitate calcium vanadate was demonstrated by the following experiment with synthetic ore concentrates. A vanadium ore of the type described in Example I was mixed in varying proportions with wulfenite ($PbMoO_4$) to obtain synthetic concentrates having molybdenum to vanadium ratios of 0.2, 0.4, 0.6, 0.8, and 1.0. These synthetic concentrates were processed from fusion through the acid leach step in the manner described in Example I with the following results:

| Ratio, Mo/V | Slag Mo (grams) | Leach Solution Mo (grams) | Filtrate-CaO Treatment Mo (grams) | Precipitate CaO Treatment Mo (grams) | Acid Leach Solution Mo (grams) |
|---|---|---|---|---|---|
| 0.2 | 1.25 | 1.04 | 1.06 | 0 | 0 |
| 0.4 | 2.27 | 2.24 | 2.08 | 0.1 | 0 |
| 0.6 | 2.53 | 2.45 | 2.57 | 0 | 0 |
| 0.8 | 4.16 | 3.76 | 3.86 | 0 | 0 |
| 1.0 | 4.43 | 4.10 | 3.89 | 0.1 | 0 |

As will be seen from the above data, complete separation of vanadium from molybdenum was thus obtained over a wide range of molybdenum concentrations thereby demonstrating the practicality of the separate vanadium and molybdenum recovery features of the invention.

It is to be understood that the foregoing specific examples are presented by way of illustration and explanation and that the invention is not limited by the details of such examples.

We claim:

1. A process for treating an ore material containing oxides of vanadium and molybdenum which comprises smelting the ore material with a caustic flux, separating a slag containing water soluble compounds of vanadium and molybdenum, leaching said slag with water and separating an alkaline leach solution rich in vanadium and molybdenum, reacting said leach solution with lime to precipitate calcium vanadate therefrom while leaving the molybdenum substantially entirely in the residual leach solution, extracting the precipitated calcium vanadate with sulfuric acid to obtain an acidic vanadium-rich liquor from which vanadium can be recovered and leaving a calcium sulfate residue, concentrating a major portion of said residual alkaline leach solution and recycling the resultant concentrate as flux in the smelting step, withdrawing at least a portion of said residual leach solution without recycling the same, and reacting the withdrawn portion of residual leach solution with said calcium sulfate residue and precipitating calcium molybdate whereby to permit recovery of molybdenum and at the same time preventing excessive accumulation of molybdenum in the system as a result of recycling said concentrate.

2. The process of claim 1 further characterized in that said caustic flux comprises a mixture of sodium carbonate and sodium hydroxide.

3. The process of claim 1 further characterized in that said calcium vanadate precipitate is washed with water to avoid carry-over of molybdenum and the wash water is combined with the residual alkaline leach solution.

4. The process of claim 1 further characterized in that the reaction of said residual leach solution with said calcium sulfate residue is carried out with the calcium sulfate in aqueous slurry form at substantially the boiling point of the slurry.

5. A process for recovering vanadium from a vanadium ore containing a minor amount of molybdenum which comprises smelting the ore with a caustic flux, separating a slag containing water soluble compounds of vanadium and molybdenum, leaching said slag with water and separating an alkaline leach solution containing vanadium and molybdenum, reacting said leach solution with lime to precipitate calcium vanadate therefrom while leaving the molybdenum substantially entirely in the residual leach solution, treating the precipitated calcium vanadate with sulfuric acid to extract vanadium therefrom and leaving a calcium sulfate residue, recovering vanadium from the resultant acidic extract, concentrating said residual leach solution and recycling the resultant concentrate as flux in the smelting step whereby the molybdenum contained in said residual leach solution is also recycled within the process, discontinuing the recycling of said concentrate and subsequently withdrawing said residual leach solution without recycle thereof when the molybdenum concentration has built-up to a predetermined concentration in the system, reacting said calcium sulfate residue with the withdrawn residual leach solution whereby to precipitate calcium molybdate thereby permitting recovery of molybdenum and at the same time preventing excessive accumulation of molybdenum in the system as a result of recycling said concentrate, and thereafter resuming the concentration and recycling of said residual leach solution.

6. The process of claim 5 further characterized in that the reaction of said residual leach solution with said calcium sulfate residue is carried out with the calcium sulfate in aqueous slurry form at substantially the boiling point of the slurry.

References Cited in the file of this patent
UNITED STATES PATENTS

| | | |
|---|---|---|
| 787,758 | Herrenschmidt | Apr. 18, 1905 |
| 1,028,774 | Perret | June 4, 1912 |
| 2,187,750 | Marvin | Jan. 23, 1940 |
| 2,316,330 | Hawk | Apr. 13, 1943 |
| 2,686,114 | McGauley et al. | Aug. 10, 1954 |
| 2,697,650 | Hixon et al. | Dec. 21, 1954 |

OTHER REFERENCES

Handbook of Nonferrous Metallurgy, Recovery of the Metals, by Liddel; publ. 1945 by McGraw-Hill Book Co., Inc., New York. Pages 617 and 618, 634.

Chemical and Metallurgical Engineering, vol. 20, No. 10, May 15, 1919, pages 514–518, article by Conley; and vol. 21, No. 6, Sept. 15, 1919, pages 364–369, article by Bonardi.